(12) United States Patent
Benson

(10) Patent No.: US 12,202,626 B2
(45) Date of Patent: Jan. 21, 2025

(54) HIGH EFFICIENCY FLIGHT LINE COOLING, HEATING, AND DEHUMIDIFICATION SYSTEM

(71) Applicant: Energy Quest Technologies Inc., Chandler, AZ (US)

(72) Inventor: Dwayne M. Benson, Chandler, AZ (US)

(73) Assignee: Energy Quest Technologies Inc., Chandler, AZ (US)

( * ) Notice: Subject to any disclaimer, the term of this patent is extended or adjusted under 35 U.S.C. 154(b) by 253 days.

(21) Appl. No.: 17/660,293

(22) Filed: Apr. 22, 2022

(65) Prior Publication Data

US 2022/0340303 A1 Oct. 27, 2022

Related U.S. Application Data

(60) Provisional application No. 63/178,975, filed on Apr. 23, 2021.

(51) Int. Cl.
*B64F 1/36* (2024.01)
*B64D 13/06* (2006.01)
*B64D 13/08* (2006.01)

(52) U.S. Cl.
CPC .............. *B64F 1/364* (2013.01); *B64D 13/06* (2013.01); *B64D 2013/0603* (2013.01); *B64D 2013/0611* (2013.01); *B64D 13/08* (2013.01); *B64F 1/362* (2013.01)

(58) Field of Classification Search
CPC . F25B 5/02; B64F 1/364; F24F 1/0093; F24F 1/0375; F24F 1/039; F24F 1/029; F24F 1/42; F24F 3/153; F24F 2221/34; F24F 13/20; F25D 2317/0682; F25D 2323/00281

See application file for complete search history.

(56) References Cited

U.S. PATENT DOCUMENTS

| | | | | |
|---|---|---|---|---|
| 2004/0089002 A1* | 5/2004 | Rayburn | ................. | F24F 3/153 62/93 |
| 2009/0107159 A1* | 4/2009 | Mann, III | ............... | B64F 1/364 62/239 |
| 2013/0247600 A1* | 9/2013 | Lu | ......................... | F25D 17/067 62/89 |
| 2015/0198340 A1* | 7/2015 | Hancock | ................... | F24F 1/48 62/506 |
| 2018/0231276 A1* | 8/2018 | Hansen | ..................... | F25B 1/00 |
| 2020/0262585 A1* | 8/2020 | Dahl | ....................... | H02J 9/062 |

* cited by examiner

Primary Examiner — Joseph F Trpisovsky
(74) Attorney, Agent, or Firm — Brian M. Kaufman; Robert D. Atkins; PATENT LAW GROUP: Atkins and Association, P.C.

(57) ABSTRACT

An HVAC system has a duct with an inlet and an outlet. A first supercharger is disposed in the duct. A second supercharger is disposed in the duct in parallel with the first supercharger. A gearbox has a first output shaft coupled to the first supercharger and a second output shaft of the gearbox coupled to the second supercharger. A first evaporation coil is disposed in the duct between the supercharger and inlet. A second evaporation coil is disposed in the duct between the supercharger and outlet. A heater is disposed in the duct between the supercharger and outlet.

19 Claims, 14 Drawing Sheets

HIGH EFFICIENCY FLIGHT LINE COOLING, HEATING, AND DEHUMIDIFICATION SYSTEM

CLAIM OF DOMESTIC PRIORITY

The present application claims the benefit of U.S. Provisional Application No. 63/178,975, filed Apr. 23, 2021, which application is incorporated herein by reference.

FIELD OF THE INVENTION

The present invention relates in general to heating, ventilation, and air conditioning (HVAC) systems, and, more particularly, to a high efficiency cooling, heating, and dehumidification system.

BACKGROUND OF THE INVENTION

HVAC systems are commonly used in a wide variety of settings. Most homes and other buildings today have central air conditioning. Vehicles typically have air conditioning for the comfort of the drivers and passengers, as well as to keep cargo at a desired temperature. Air conditioners can be fixed units installed at a location. Other units are mobile and may have wheels allowing the air conditioner to be pulled wherever needed. Air conditioning trailers are commonly used with airplanes to keep the airplane interior at a desired temperature. The trailer can be pulled between planes as needed.

Mobile air conditioning systems are critical to many different fields. However, existing systems typically require combining multiple trailers to get all the needed features. Moreover, most systems are not very efficient and consume an exceedingly high amount of fuel. Therefore, a need exists for an air conditioning system that efficiently provides heating, cooling, and dehumidification capabilities in a single package.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
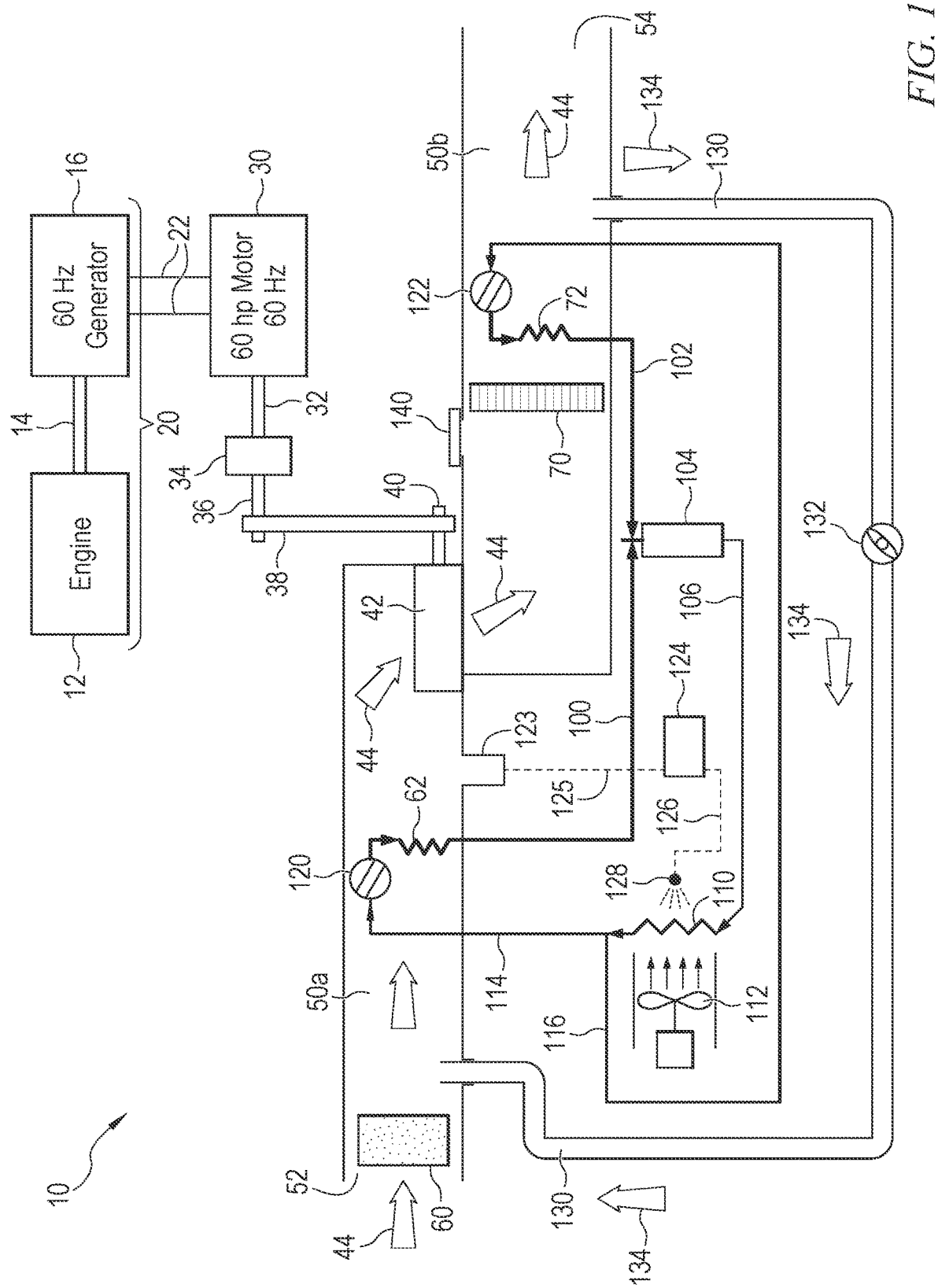
FIG. 1 is a schematic diagram of an HVAC system.

FIG. 1 illustrates a schematic diagram of an HVAC system 10. HVAC system 10 provides heating, cooling, and dehumidification in a highly efficient manner. HVAC system 10 is powered by an engine 12, such as a gasoline engine, diesel engine, or other suitable prime mover. Engine 12 converts chemical energy of a fuel into kinetic motion as rotation of a power takeoff 14. An electrical generator 16 is attached to receive power from power takeoff 14 and generate electrical power. The electrical power output from generator 16 is typically 220-480 volts AC and 60 Hz, but any suitable power signal can be generated. One specific embodiment utilizes an inverter to generate a 400 Hz output power signal. Direct current (DC) power can also be generated by a power converter. 270 volts or 28 volts DC are the two most commonly used.

In combination, engine 12 and electrical generator 16 form a genset 20 that converts chemical energy of a fuel into electrical energy output as a power signal on electrical lines 22. In some embodiments, HVAC system 10 can be powered by power from an electrical grid rather than a dedicated genset 20. A switch can be used to toggle between grid power and power from genset 20. In another embodiment, power is provided by an onboard or separate battery pack and inverter.

Genset 20 can also be used to provide electrical power to any desired devices, not just those shown for HVAC system 10. Electrical lines 22 are routed throughout the system to any component that needs to be powered by electricity. In some cases, power converters can be used to change the output of generator 16 into another suitable voltage, e.g., 12-24V DC.

Generator 16 is connected to an electrical motor 30 that is used to drive air through HVAC system 10. Motor 30 is a 60-horsepower motor in one embodiment. Motor 30 takes electrical energy from electrical lines 22 and outputs mechanical energy by rotating power takeoff 32. Power takeoff 32 optionally extends into a gearbox 34 that steps up or down the rotational speed of gearbox output 36. Gearbox 34 may not be used in all embodiments. In some embodiments, gearbox 34 has a separate input shaft coupled to power takeoff 32 by a belt, chain, or otherwise. Belts 38 transfer the rotational energy from gearbox output 36 to rotate the input shaft 40 of supercharger 42. Belts 38 are tooth belt in one embodiment. In other embodiments, input shaft 40 is directly coupled to gearbox output 36 by gears or by being a common shaft. Supercharger 42 can likewise be directly coupled to motor 30 without gearbox 34. Any suitable air blower can be used instead of a supercharger.

Supercharger 42 extends across the main air duct 50 through HVAC system 10. Air duct 50 includes a portion 50a before or upstream from supercharger 42, and a portion 50b after or downstream of supercharger 42. Supercharger 42 spins to transfer air from upstream duct 50a to downstream duct 50b, thereby increasing air pressure within the downstream duct and moving air through the system. Ambient air is pulled in at inlet 52 and conditioned air is expelled at outlet 54. The rotational speed of input shaft 40 of supercharger 40 determines the speed at which air moves through duct 50 between inlet 52 and outlet 54. The air speed can be changed by modifying the power input to motor 30 or by changing the gear ratio of gearbox 34.

In some embodiments, multiple superchargers 42 are used in parallel. Superchargers 42 can be operated at different speeds by gearbox 34, thus allowing a wider variety and easier configuration of air flow rates. In one embodiment, gearbox 34 has two gearbox outputs 36a and 36b. Gearbox outputs 36a and 36b can each be independently operated at different speeds, e.g., high gear and low gear. Gearbox outputs 36a and 36b can be connected to two different superchargers 42a and 42b so that the superchargers can independently be controlled and run at different speeds. Gearbox 34 can operate both superchargers 42a and 42b in low gear for an overall low output, operate one in high gear and one in low gear for an intermediate output, and run both superchargers in high gear for an overall high output.

In another embodiment, three superchargers 42a, 42b, and 42c are used with the same two gearbox outputs 36a and 36b. Supercharger 42a can be powered by gearbox output 36a, with superchargers 42b and 42c both powered by gearbox output 36b. Gearbox 34 can run all three superchargers 42 at low speed by running both gearbox outputs 36 in low gear, run one of the three superchargers at high speed by running only gearbox output 36a at high speed, run two of the three superchargers at high speed by running only gearbox output 36b in high gear, or run all three superchargers at high speed by running both gearbox outputs in high gear. The number of superchargers 42 being run at high speed versus low speed determines the overall air flow through duct 50. Any number of superchargers 42 can be used and operated independently or in groups at any number of desired speeds.

As air is pulled into inlet 52, the air first travels through an air filter 60. Air filter 60 is a HEPA filter in one embodiment. Air filter 60 helps keep dirt, dust, and other debris out of HVAC system 10. Filtered air that has traveled through inlet 52 and air filter 60 continues travelling through upstream duct 50a and is routed through an upstream evaporator (evap) coil 62. Evaporator coil 62 cools air as the air flows through the evaporator coil. Evaporator coil 62 also dehumidifies because the low temperature of the evaporator coil causes moisture in the air to condensate onto the evaporator coil.

Air, having been filtered by air filter 60, and then cooled and dehumidified by evaporator coil 62, is pulled through superchargers 42 and into downstream duct 50b. Downstream duct 50b has a heater 70. Heater 70 is an electrical heater in one embodiment and powered by electricity from generator 16 via electrical lines 22. A heater 70 with a relatively low watt density may be preferred. Heater 70 can be used without evaporator coil 62 being operational to heat the air instead of cooling the air.

Heater 70 can also be used in conjunction with evaporator coil 62 cooling the air. Evaporator coil 62 is relied upon to dehumidify the air and cooling the air may not be desired. In that case, heater 70 is used to return the air to its original temperature, or to increase the air temperature to any desired target temperature, after being dehumidified by evaporator coil 62.

After heater 70, air flows through downstream evaporator coil 72. Downstream evaporator coil 72 operates in parallel with, and as part of the same heat pump as, upstream evaporator coil 62. Both evaporator coils 62 and 72 can operate together to cool air, or either evaporator coil can be used by itself. In one embodiment, evaporator coils 62 and 72 are each 20-ton coolers. Neither evaporator coil 62 nor evaporator coil 72 is used in modes when air is only heated by heater 70. After evaporator coil 72, air exits HVAC system 10 at outlet 54. Air leaving via outlet 54 is typically routed by another duct to the volume to be air conditioned.

The heat pump system that is used to cool air via vaporator coils 62 and 72 routes a refrigerant fluid through a heat cycle. Gaseous refrigerant leaving evaporator coils 62 and 72 is routed through conduits 100 and 102, respectively, to a compressor 104. Compressor 104 compresses the refrigerant to a higher pressure, which increases a temperature of the refrigerant above ambient air temperature. The hot, gaseous refrigerant flows through conduit 106 to condenser coil 110. A fan 112 blows ambient air over condenser coil 110 to cool the refrigerant and condense the refrigerant to a liquid.

After leaving condenser coil 110, the refrigerant is split again into two different conduits 114 and 116 to evaporator coils 62 and 72, respectively. Expansion valves 120 and 122 expand the refrigerant to cool the refrigerant down well below ambient before the refrigerant flows through evaporator coils 62 and 72, respectively. The refrigerant is a two-phase fluid coming out of expansion valves 120 and 122, i.e., partially liquid and partially gas. Refrigerant continues flowing through compressor 104, condenser coil 110, expansion valves 120-122, and evaporator coils 62 and 72 to perform the refrigeration cycle as long as cooling of air via the evaporator coils is desired. The described parts that refrigerant flows through are a heat pump. A reversing valve could be used to allow the heat pump to warm air instead of or in addition to cooling the air.

As discussed above, evaporator coil 62 is relied upon to dehumidify the air in addition to cooling. Dehumidification occurs via condensation from the air onto evaporator coil 62. Upstream duct 50a includes a trough 123 under evaporator coil 62 to collect condensation. Condensation is routed via conduit 125 to a reservoir and pump combination unit 124. Reservoir/pump 124 stores excess condensation and then pumps the collected condensation out via conduit 126 to a spray nozzle 128. Spray nozzle 128 is pointed at condenser coil 110 to spray the collected condensation onto the condenser coil.

Misting condenser coil 110 with condensation collected from evaporator coil 62 helps cool down the refrigerant in the condenser coil in two ways. First, the mist directly cools condenser coil 110 because the condensation was previously cooled down by evaporator coil 62. Second, the mist cools condenser coil 110 by evaporative cooling when the water is heated by the condenser coil and evaporates.

In some embodiments, condensation from evaporator coil 72 is also collected into reservoir/pump 124. However, there is typically significantly less condensation generated by evaporator coil 72 than evaporator coil 62 and collection from evaporator coil 72 may not be worthwhile. Condensation from evaporator coil 72 can simply be drained to the ground or any other desired area.

HVAC system 10 includes a backflow duct 130 that allows air to flow from downstream duct 50b back to upstream duct 50a. Arrows 134 illustrate the direction of air flow through backflow duct 130. A pressure control valve 132 is connected in series along backflow duct 130 to control the amount of air flow allowed to flow through the backflow duct. In one embodiment, pressure control valve 132 completely blocks air flow through backflow duct 130 until air pressure in downstream duct 50b exceeds a maximum desired pressure threshold. Excess air pressure above the threshold is relieved by routing the air back to upstream duct 50a. Pressure control valve 132 is a computer controlled valve in one embodiment, that opens when detected output air pressure reaches a set threshold. Output air pressure can be difficult to control with turbochargers 42 alone, so configuring a pressure setting for pressure control valve 132 allows a variable max pressure to be used. The max pressure for pressure control valve 132 can be set based on the max pressure a specific aircraft that is hooked up can handle.

Downstream duct 50b also includes a pressure relief valve 140. Pressure relief valve 140 operates similarly to pressure control valve 132 in that the pressure relief valve opens up if air pressure within downstream duct 50b reaches a threshold value. Typically pressure relief valve 140 is relied upon as a backstop of last resort in case backflow duct 130 is unable to handle the excess air pressure or if something goes haywire and pressure increases beyond the directed level.

Pressure relief valve 140 opens up to let air out to the environment. Pressure relief valve 140 is completely mechanical and set at the factory to open before output pressure reaches the maximum safe pressure for HVAC system 10.

As illustrated, pressure relief valve 140 opens into downstream duct 50*b* before heater 70, and backflow duct 130 opens up into the downstream duct after evaporator coil 72. However, in other embodiments the pressure relief valve 140 and backflow duct 130 can be connected at any desired location within downstream duct 50*b*. Backflow duct 130 can also be connected to any desired location within upstream duct 50*a*, or simply be configured to evacuate air out to the environment.

HVAC system 10 can operate in one of several different modes. In dehumidification mode, upstream evaporator coil 62 is enabled to cool the air in upstream duct 50*a*. The cooling of the air causes humidity to condense out of the air onto evaporator coil 62. In one embodiment, evaporator coil 62 cools down the air to 45 degrees Fahrenheit, thereby fixing the dew point at 45 degrees.

The cooled air in dehumidification mode is returned to the temperature of ambient using heater 70, or in some instances just the action of superchargers 42 is sufficient to return the air temperature to ambient. In other cases, the desired output temperature for dehumidification is 120-140 degrees Fahrenheit, which is achieved using heater 70. The hot and dry air injected into, e.g., an aircraft dries out the space rapidly. Downstream evaporator coil 72 is typically not used in dehumidification mode.

In cooling mode, evaporator coil 62 is set to 45 degrees as in dehumidification mode. Again, superchargers 42 will increase the air temperature back up near ambient. Then, evaporator coil 72 is used to cool the air down to the desired air-conditioned temperature. Evaporator coils 62 and 72 are independently enabled or disabled using their respective expansion valves 120 and 122 to set the mode. In pure heating mode, the heat pump does not run at all, neither evaporator coil 62 nor 72 is enabled, and the air is simply warmed by heater 70 to the desired temperature. In blower-only mode, heater 70 is not used, and the air is only blown through by superchargers 42, which typically do add some heat to the air.

Figure 2A:
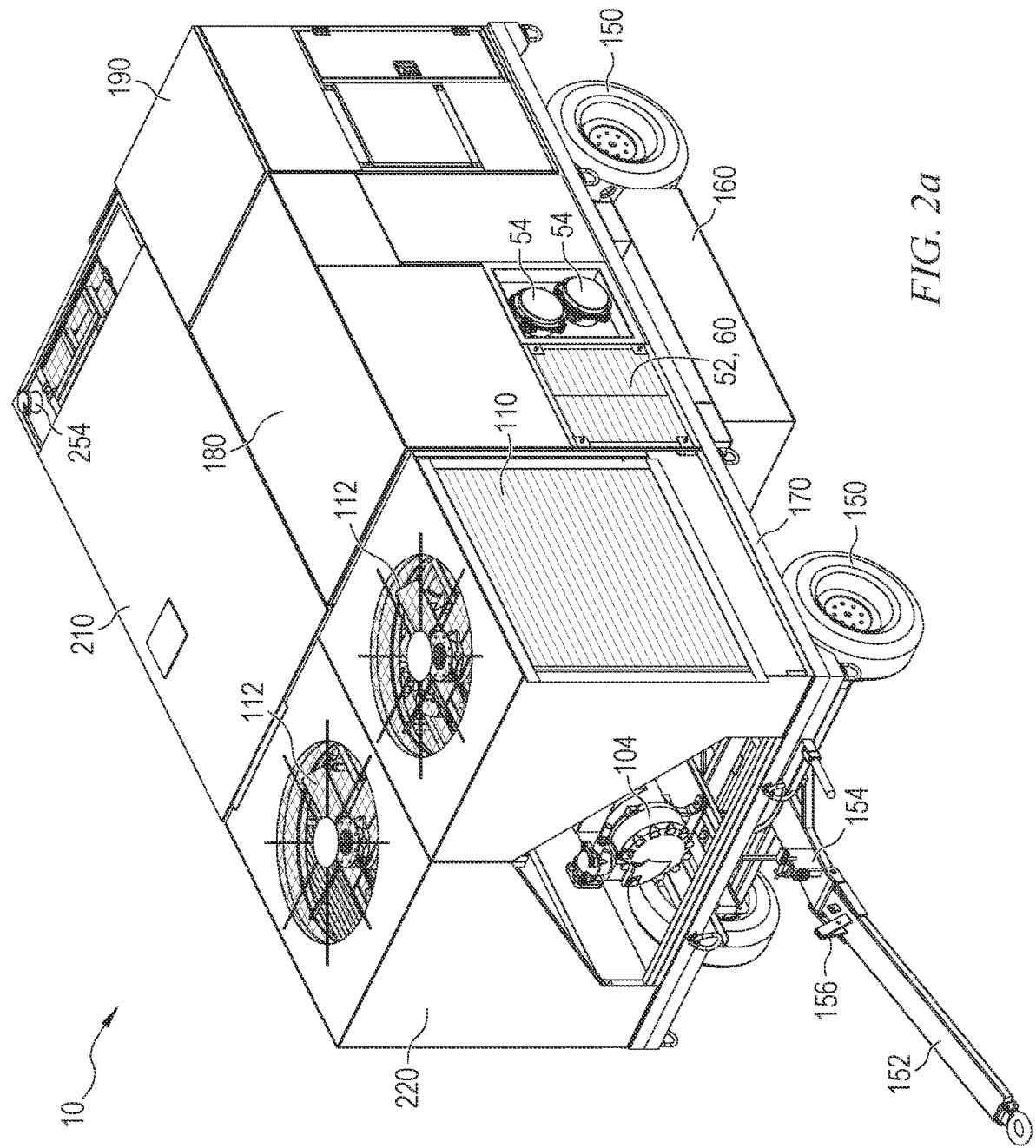
FIGS. 2a-2c illustrate a trailer embodiment.
Figure 2B:
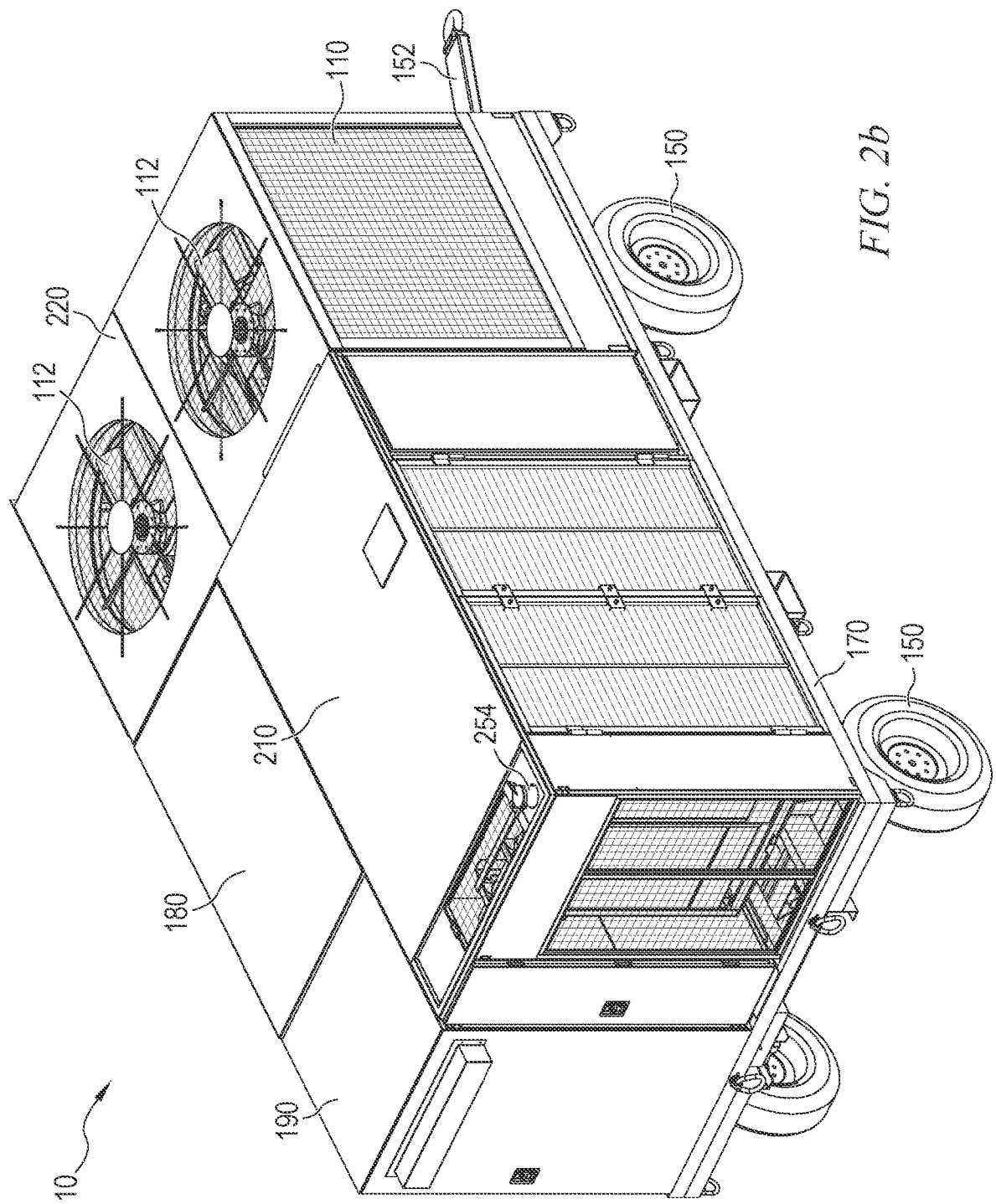
Figure 2C:
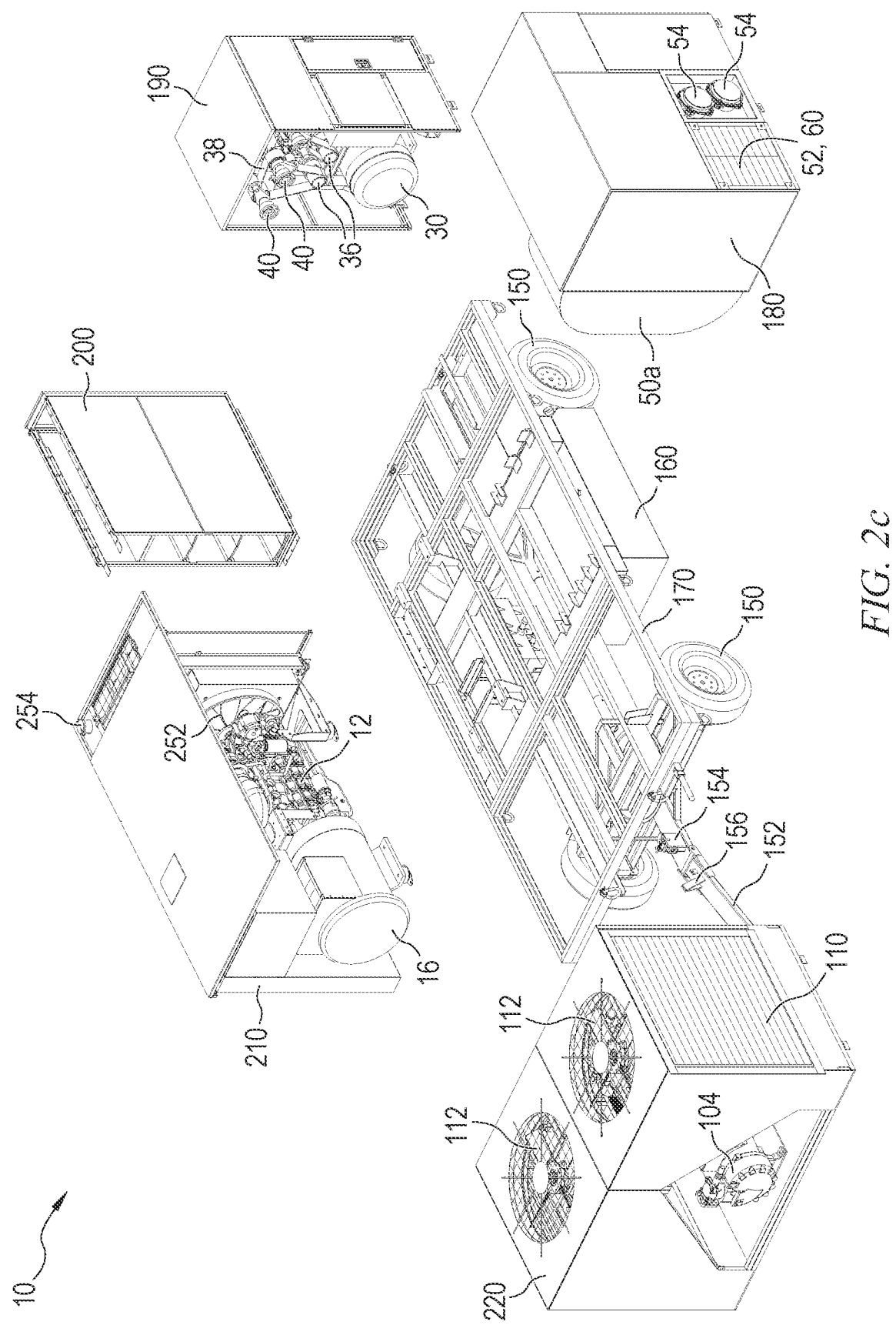

The remaining figures illustrate an embodiment of HVAC system 10 in the form-factor of a trailer. The components have all been configured to fit onto the trailer and interface properly with each other. Other embodiments are possible, such as a fixed installation or a drivable mobile unit. FIGS. 2*a*-2*c* illustrate the trailer as a whole. FIG. 2*a* and FIG. 2*b* show two different perspective views from opposite corners of the trailer. FIG. 2*c* shows a view from the same angle as FIG. 2*a* but with the various modules exploded apart.

FIG. 2*a* shows the trailer of HVAC system 10 being supported on a frame 170. Frame 170 includes a support platform for the other components as well as other structures for the components to be fastened to. Four wheels 150 are attached under frame 170 to allow the trailer to roll easily when pulled. A tow bar 152 extends forward to attach the trailer to a truck and thereby pull the trailer around to a desired location. Tow bar 152 has a hinge to be folded up and down. Latch 154 on tow bar 152 allows the tow bar to be held vertically by interfacing with extension 156 on the tow bar. Latch 154 and extension 156 can be self-latching with a release mechanism, or a separate pin can be inserted through both parts to keep tow bar 152 vertical. Frame 170 also includes a fuel tank 160 under the frame to provide a source of fuel for engine 12.

In FIG. 2*a*, condenser module 220 is oriented toward the viewer's left-hand side. Two fans 112 operate in parallel in this embodiment and are visible on the top surface of condenser module 220. Fans 112 blow air through a pair of condenser coils 110 disposed on opposite sides of the trailer. Condenser 104 is centrally located under fans 112 and between condenser coils 110. Condenser module 220 includes air pathways to route air between fans 112 and condenser coils 110.

Air handler module 180 is disposed directly adjacent to condenser module 220 in the view of FIG. 2*a*. Inlet 52 and outlet 54 are illustrated as part of air handler module 180. Inlet 52 can include a vent over filter 60 or just filter the filter exposed within the inlet. Outlet 54 includes two hose hookups which allow for routing of air flow through hoses to airplanes or another space to be conditioned. Outlets 54 include lids that can be removed to connect a hose. The lids block air flow when an outlet 54 is not being used, that way only one outlet can have a hose connected and air pressure is not lost out of the other outlet. Outlets 54 can have any suitable hose or duct hookup.

FIG. 2*c* shows the various modules of the HVAC system 10 trailer separated from each other. Separating out the components reveals some subcomponents within the modules. Blower driver module 190 contains motor 30, gearbox 34 with gearbox output 36 visible, superchargers 42 with input shafts 40 visible, and belts 38 physically coupling the gearbox to the superchargers.

Genset module 210 includes engine 12 and electrical generator 16. A hose storage module 200 is disposed between genset module 210 and blower driver module 190. More details of each module will be illustrated and described below.

Figure 3A:
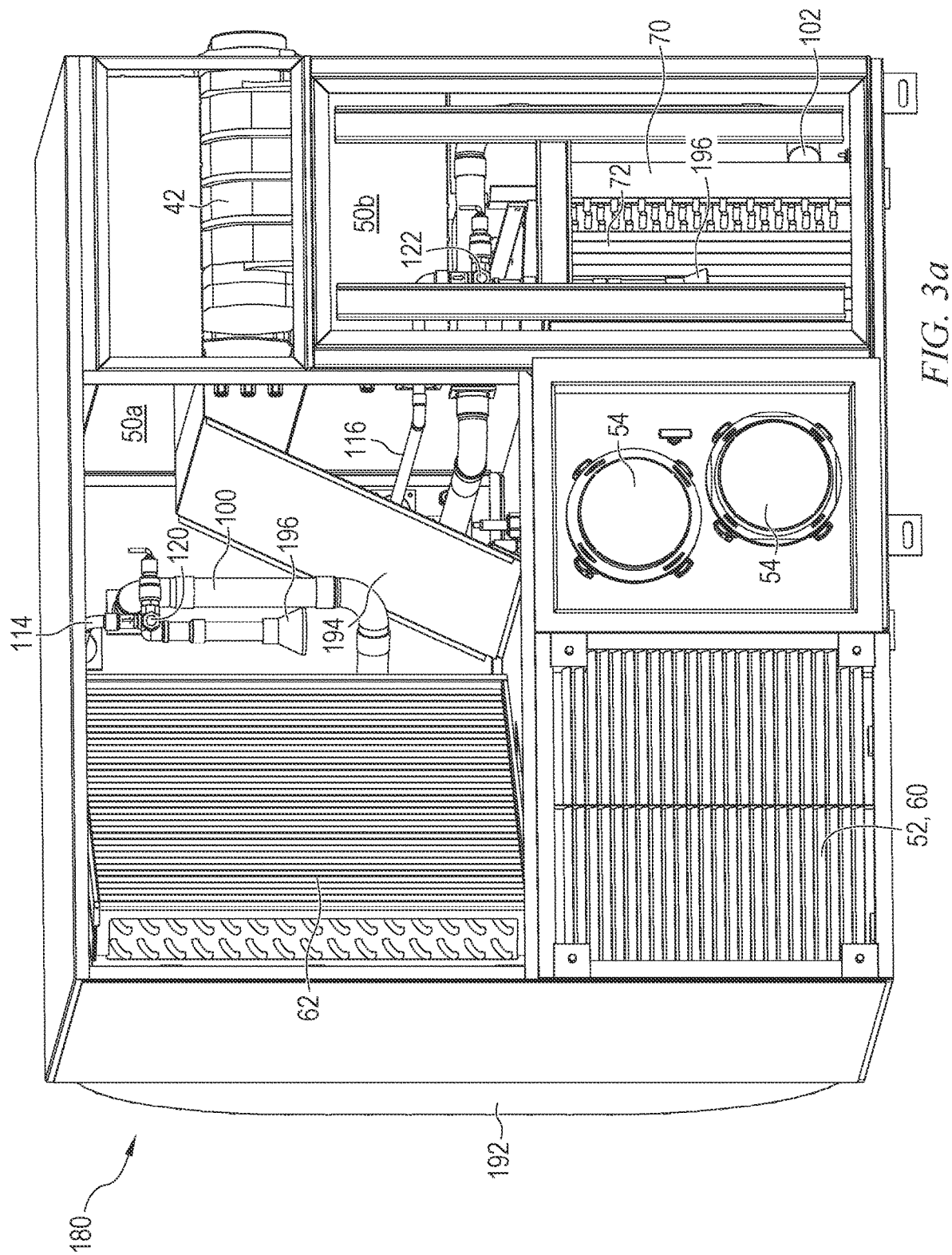
FIGS. 3a-3f illustrate an air handler module.

FIGS. 3*a*-3*f* illustrate additional details of air handler module 180. FIG. 3*a* shows a view of air handler module 180 from the outside of the trailer with covers removed to reveal some internal components. Air filter 60 is disposed in inlet 52. A rounded duct 192 operates as part of upstream duct 50*a* and routes air flow up from inlet 52 to upstream evaporator coil 62. A plate 194 guides airflow of upstream duct 50*a* to the space above superchargers 42. Superchargers 42 pull air from above and blow the air downward into downstream duct 50*b*. Air in downstream duct 50*b* flows through heater 70 and downstream evaporator coil 72 to outlets 54.

Conduit 114 is shown routing liquid refrigerant to expansion valve 120. Below expansion valve 120 is a conical distribution nozzle 196. The bottom of distribution nozzle 196 will have about 20 spaghetti tubes coming out of the distribution nozzle that carry two-phase refrigerant from expansion valve 120 to evaporator coil 62. Conduit 100 returns gaseous refrigerant back to the compressor. Conduit 116 takes refrigerant to downstream evaporator coil 72 via expansion valve 122 and has a similar distribution nozzle 196. Conduit 102 returns refrigerant back to compressor 104.

Figure 3B:
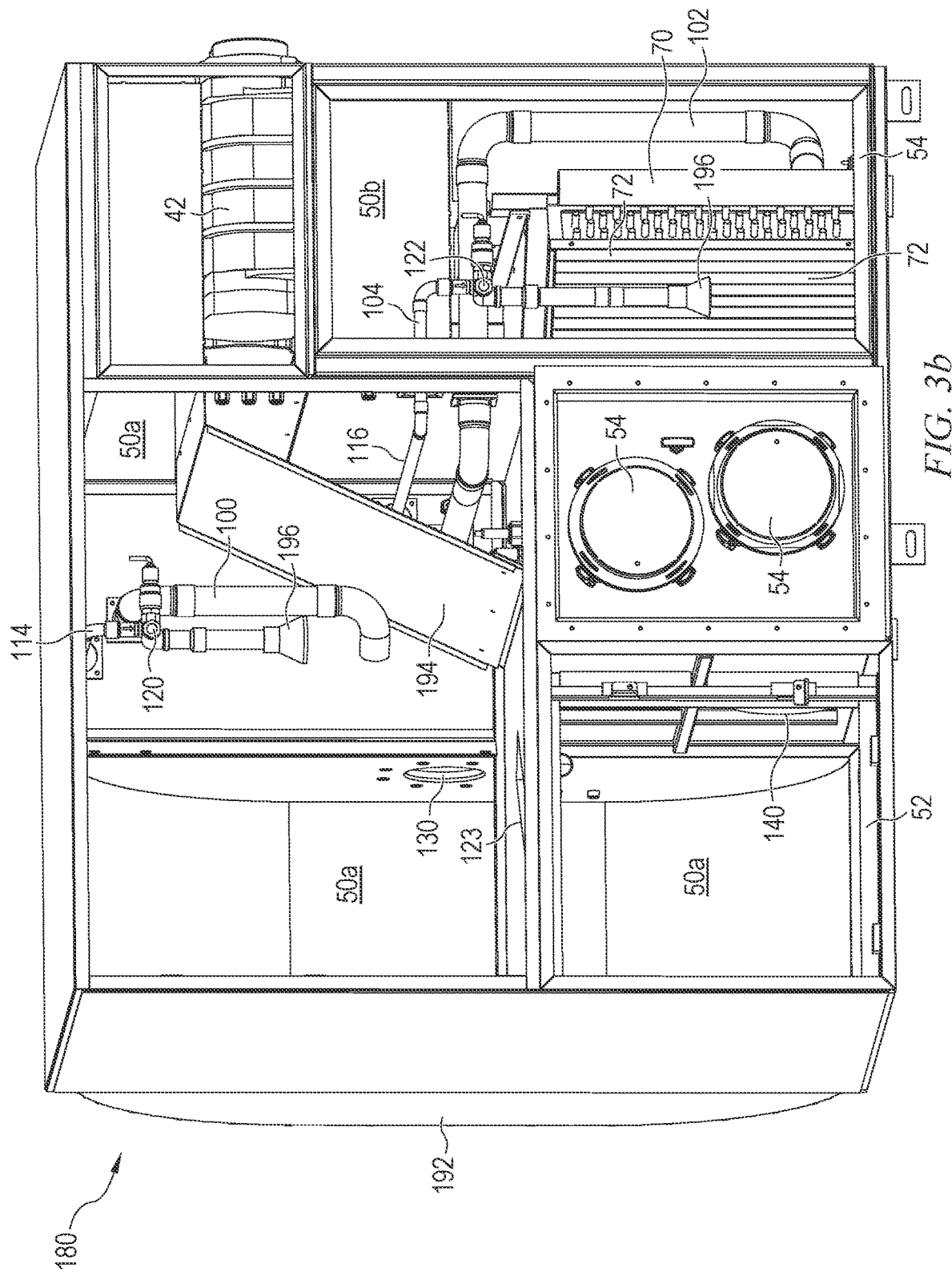

FIG. 3*b* shows the same view as FIG. 3*a*, but with some components removed to reveal more internal structure of air handler module 180. The inside of duct 192 is seen routing air from the bottom layer to the top layer of air handler module 180. The outlet of backflow duct 130 into upstream duct 50*a* is shown in duct 192. The outlet side of pressure relief valve 140 and trough 123 are just visible in the view of FIG. 3*b*.

Figure 3C:
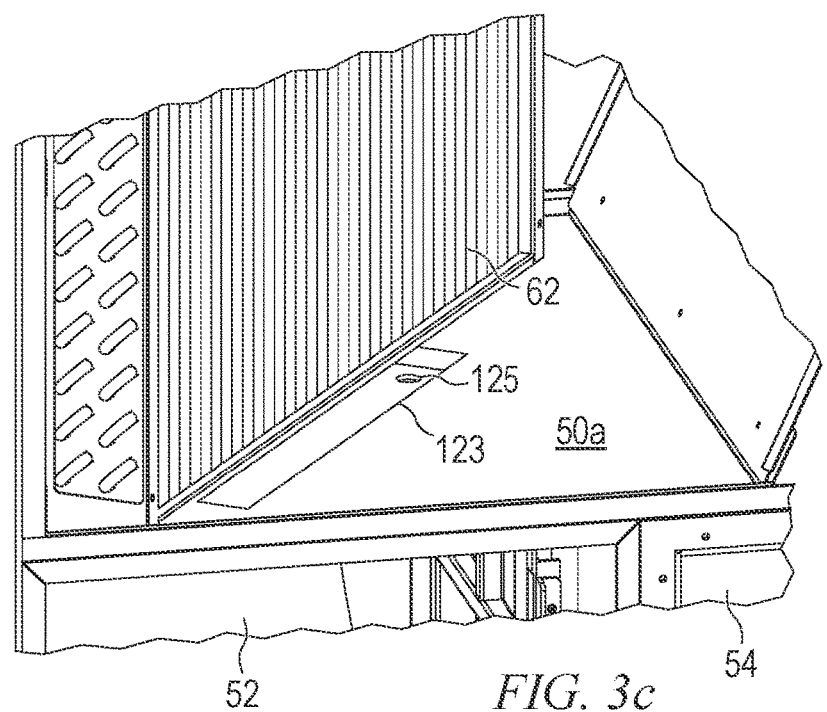
Figure 3D:
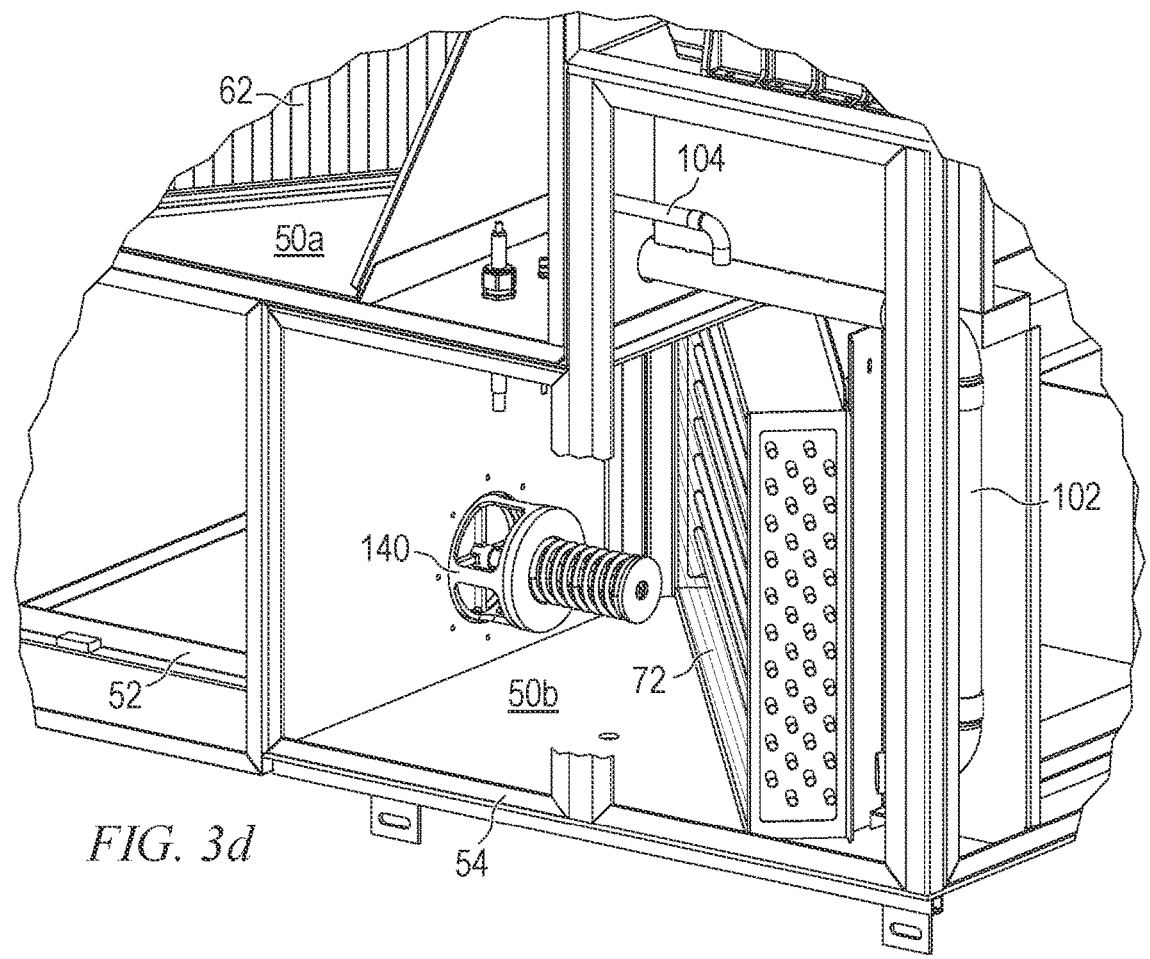

FIG. 3*c* shows a close-up view of the area under evaporator coil 62. Trough 123 with conduit 125 are more visible. FIG. 3*d* shows a close-up view of the area behind outlet 54.

Pressure relief valve 140 is shown in the wall between inlet 52 and outlet 54. Pressure relief valve 140 includes a lid on the inlet 52 side and a spring on the outlet 54 side keeping the lid closed. If pressure differential between outlet 54 and inlet 52 exceeds the pressure applied by the spring, then the lid opens and allows air to return back to the inlet side. Pressure relief valve 140 is configured to be an emergency backup to prevent damage to downstream hardware connected to outlet 54. In one embodiment, pressure relief valve 140 opens at 7 psig.

Figure 3E:
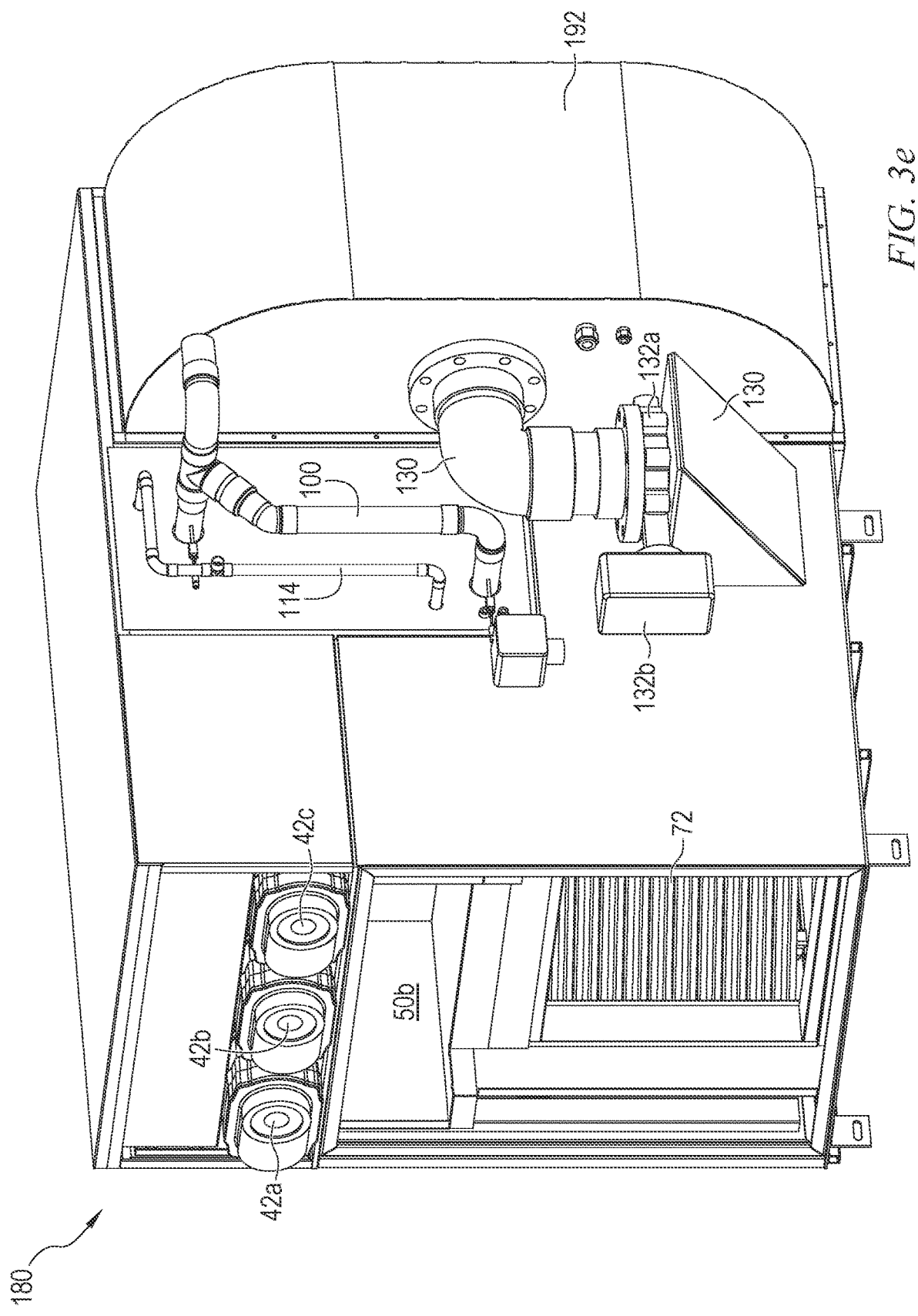

FIG. 3e shows the back side of air handler module 180, which would be internal to the trailer. Backflow conduit 130 routes air from behind outlet 54 to the middle of duct 192. Pressure control valve 132 is split into two parts in the middle of backflow conduit 130. Valve body 132a has a 6-inch butterfly disk in the middle that controls air flow through backflow conduit 130. When pressure control valve 132 is closed the disk is horizontal to stop air flow. When open, the disk is vertical to allow air to flow. Actuator 132b controls the angle of the disk in valve body 132a.

Figure 3F:
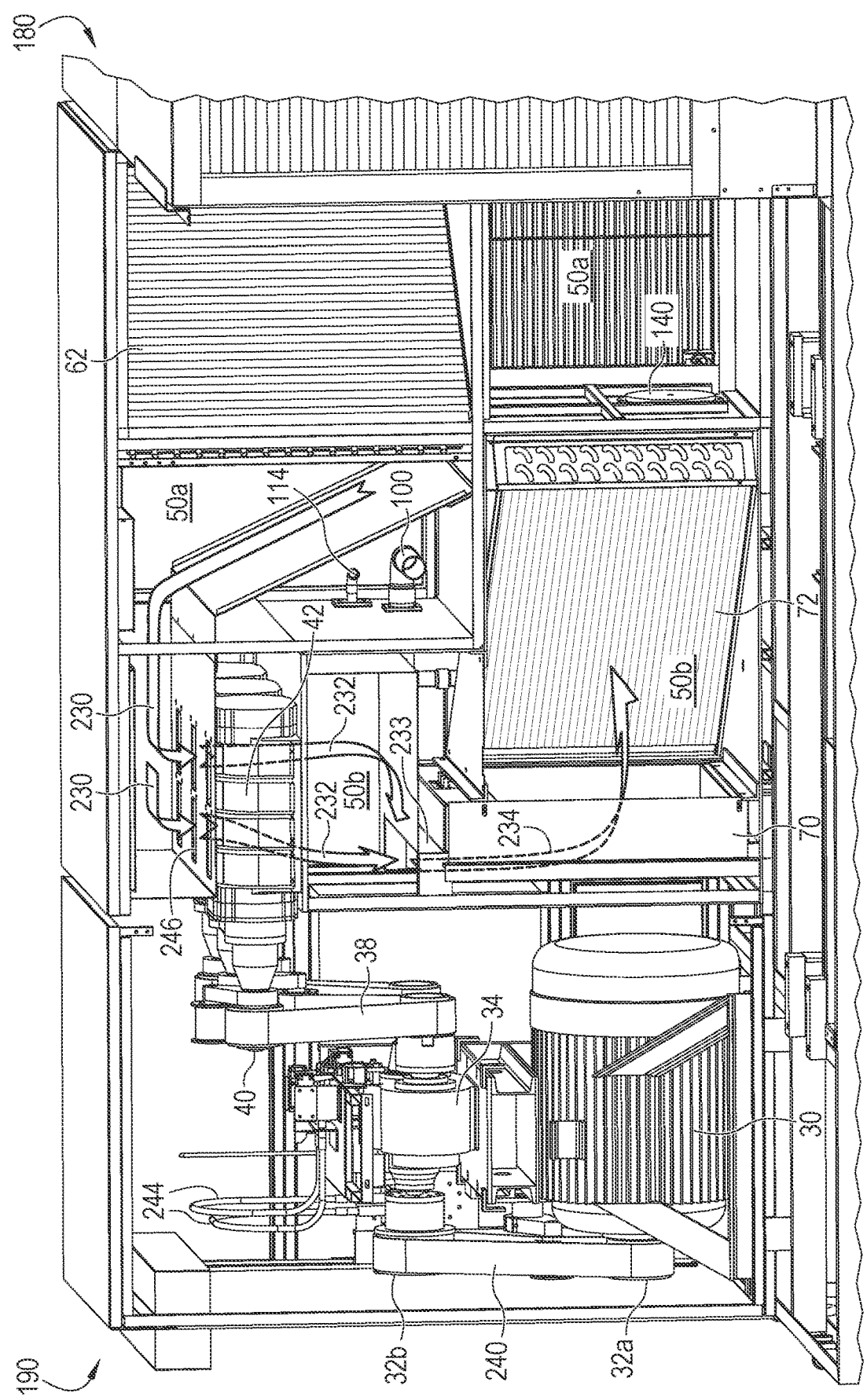

FIG. 3f shows the back side of air handler module 180 with covers removed to reveal more internal structure. Arrows 230-234 illustrate the airflow path through air handler module 180. Arrows 230 illustrate air flow up plate 194 and into the inlets of superchargers 42. Arrows 232 show airflow down through superchargers 42 and into opening 233. Arrows 234 show air flow through opening 233 and down into the space behind heater 70 before flowing through heater 70 and evaporator coil 72. FIG. 3f also shows how air handler module 180 fits with blower driver module 190, which will be illustrated and described immediately below with reference to FIGS. 4a-4c.

Figure 4A:
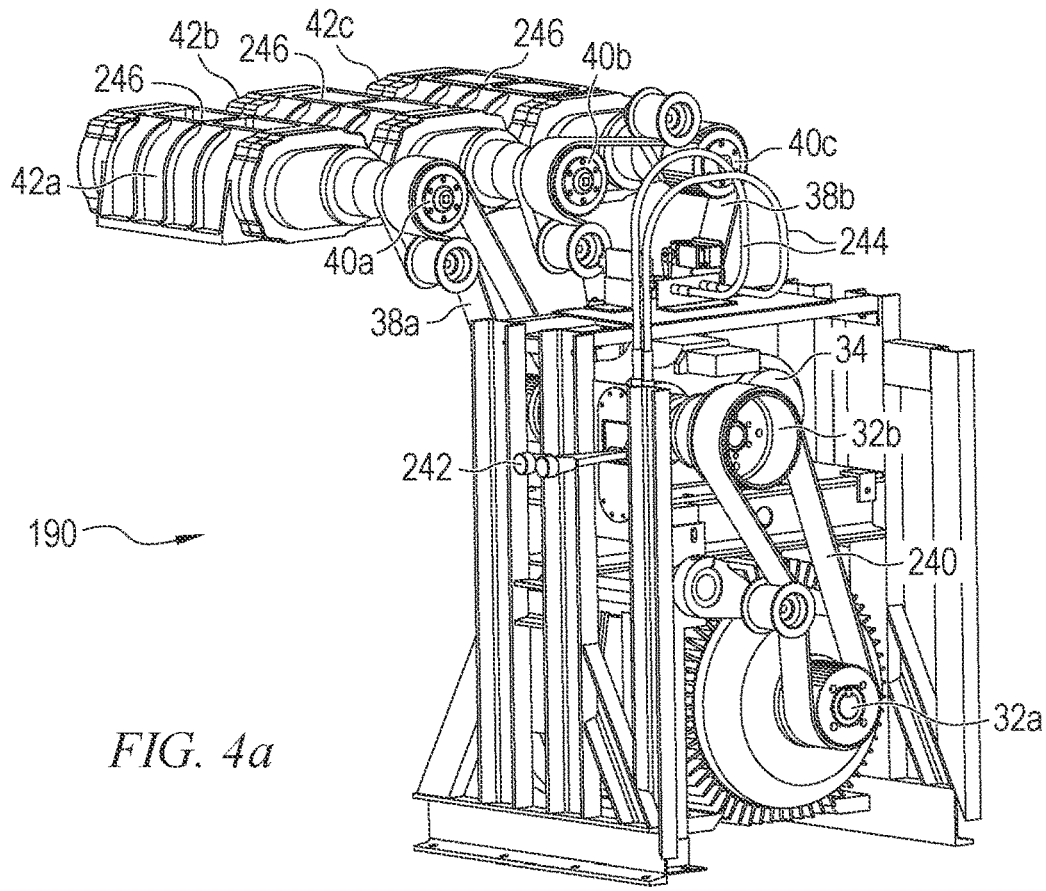
FIGS. 4a-4c illustrate a blower driver module.
Figure 4B:
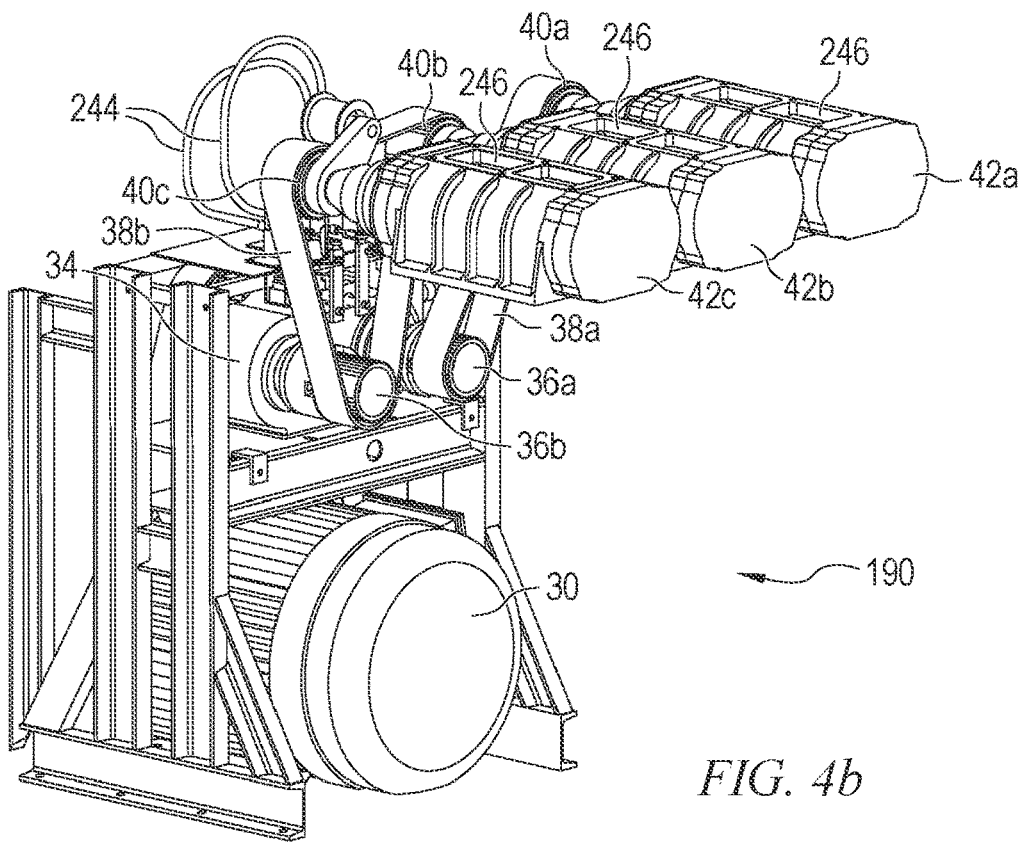
Figure 4C:
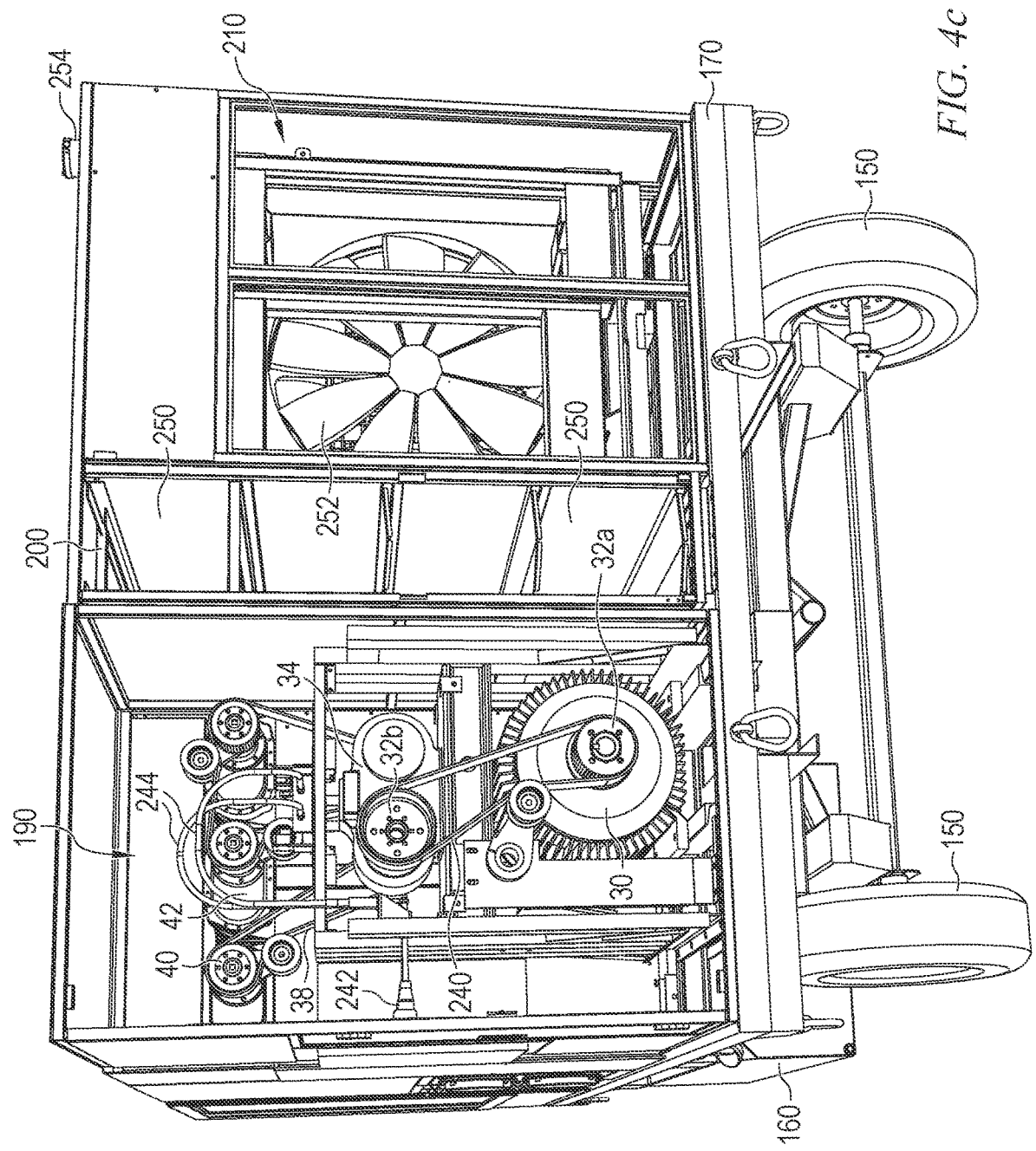

FIGS. 4a-4c show views of blower driver module 190. FIGS. 4a and 4b show external views from opposite sides of blower driver module 190 in isolation. Motor 30 takes electrical energy from genset 20 and rotates power takeoff 32. Relative to the embodiment of FIG. 1, power takeoff 32 is split into two parts, with motor 30 having a power takeoff 32a and gearbox 34 having a separate input shaft 32b. Power takeoff 32a and input shaft 32b are connected by a belt 240. Belt 240 is a tooth belt in one embodiment. In other embodiments a chain or other physical connector is provided.

Gearbox 34 has two output shafts 36a and 36b that can each independently be geared to a high or low gear. More than two gears and more than two output shafts are used in other embodiments. Belt 38a connects gearbox output 36a to input shaft 40a of supercharger 42a. Belt 38b connects gearbox output 36b to both input shaft 40b of supercharger 42b and input shaft 40c of supercharger 42c. Supercharger 42a can be run at high or low gear independently of superchargers 42b and 42c, but superchargers 42b and 42c are always running at the same speed, either high gear or low gear of gearbox 34, due to being turned by a common belt 38b.

Even with two superchargers 42b and 42c that always run at the same speed, any number of superchargers 42 between 0 and 3 can be run at high speed or low speed. One supercharger 42 can be run at high speed by having gearbox output 36a in high gear, two supercharger 42 can be run at high speed by having gearbox output 36b in high gear, or all three superchargers 42 can be run at high speed by having both gearbox outputs in high gear.

In one embodiment, motor 30 runs at 3600 rpm while the gearbox outputs run at 2600 rpm in low gear and 5500 rpm in high gear. An air mass flow of 100 lb/min and output pressure of 5.75 psig is achieved with all superchargers 42 in low gear. One supercharger 42 at high speed achieves 200 lb/min and 3.25 psig. All three superchargers 42 at high speed achieves 300 lb/min and 1.25 psig. The wide range of pressures and flow rates allow HVAC system 10 to service any aircraft in the United States Air Force. Gears within gearbox 34 are controlled by gear shift levers 242 via cables or hydraulic lines 244. Air is sucked into superchargers 42 via inlets 246 and blown out similar openings on the bottoms of the superchargers.

FIG. 4c shows the back side of the trailer with the insides of blower driver module 190 exposed. A door on the side of the trailer allows access to gear shifter levers 242. Next to blower driver module 190 is hose storage module 200. Hose storage module 200 includes a plurality of cubbies 250 for storing hoses. The hoses are designed to be fitted into outlets 54 and are used to connect the outlets to whatever space is being conditioned. Multiple hose sections can be stored and connected in series to reach further away and connected in parallel to use both outlets 54. Genset module 210 is shown adjacent to hose storage module 200. A fan 252 is used to cool engine 12.

Figure 5:
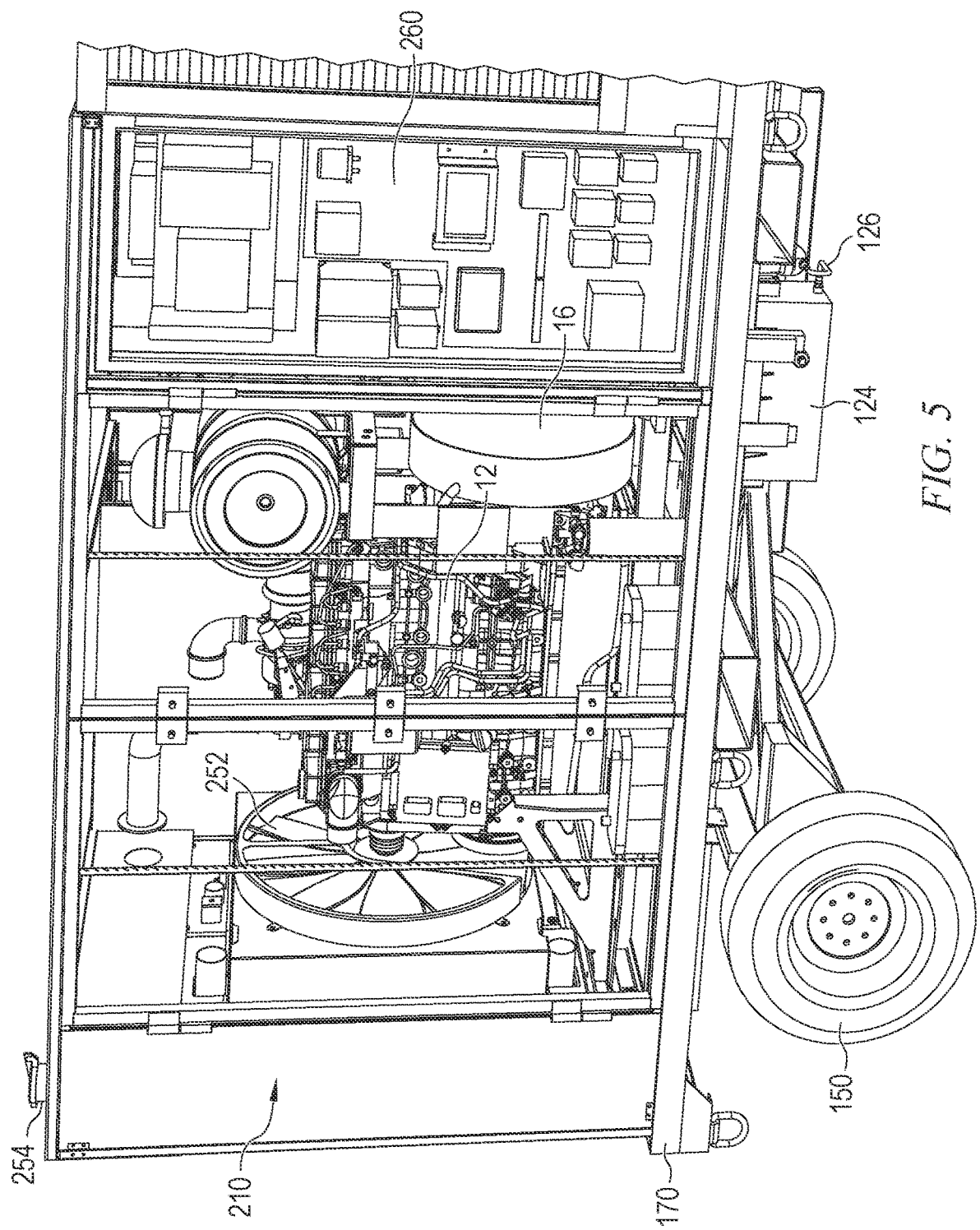
FIG. 5 illustrates a genset module.

FIG. 5 shows a side view of genset module 210 with side panels removed to reveal engine 12 and generator 16. Any suitable engine and generator can be used. Engine exhaust is routed to the top of the trailer at output 254. Generator 16 extends behind a control panel 260. Any desired or useful control elements of HVAC system 10 or the trailer can be disposed in or on control panel 260 and wired to the necessary area of the trailer. Example controls include an ethernet, serial, or other digital interface for connecting a diagnostic computer, an emergency stop dongle, warning lights, fault lights, other status indicators, an runtime hours meter, a shutdown button, a start or restart button, a mode selector to select between idle, dehumidify, cool, and heat modes, temperature and pressure control inputs, a pressure limiter setting, a power selector to select between being powered by genset 20 or an external power input, a message display, a touchscreen display and input, a switch to turn a 24V power converter on and off, a panel light switch, and other generator controls. In addition to control elements, control panel 260 can have contactors, fuses, breakers, and other components mounted onto it.

Figure 6A:
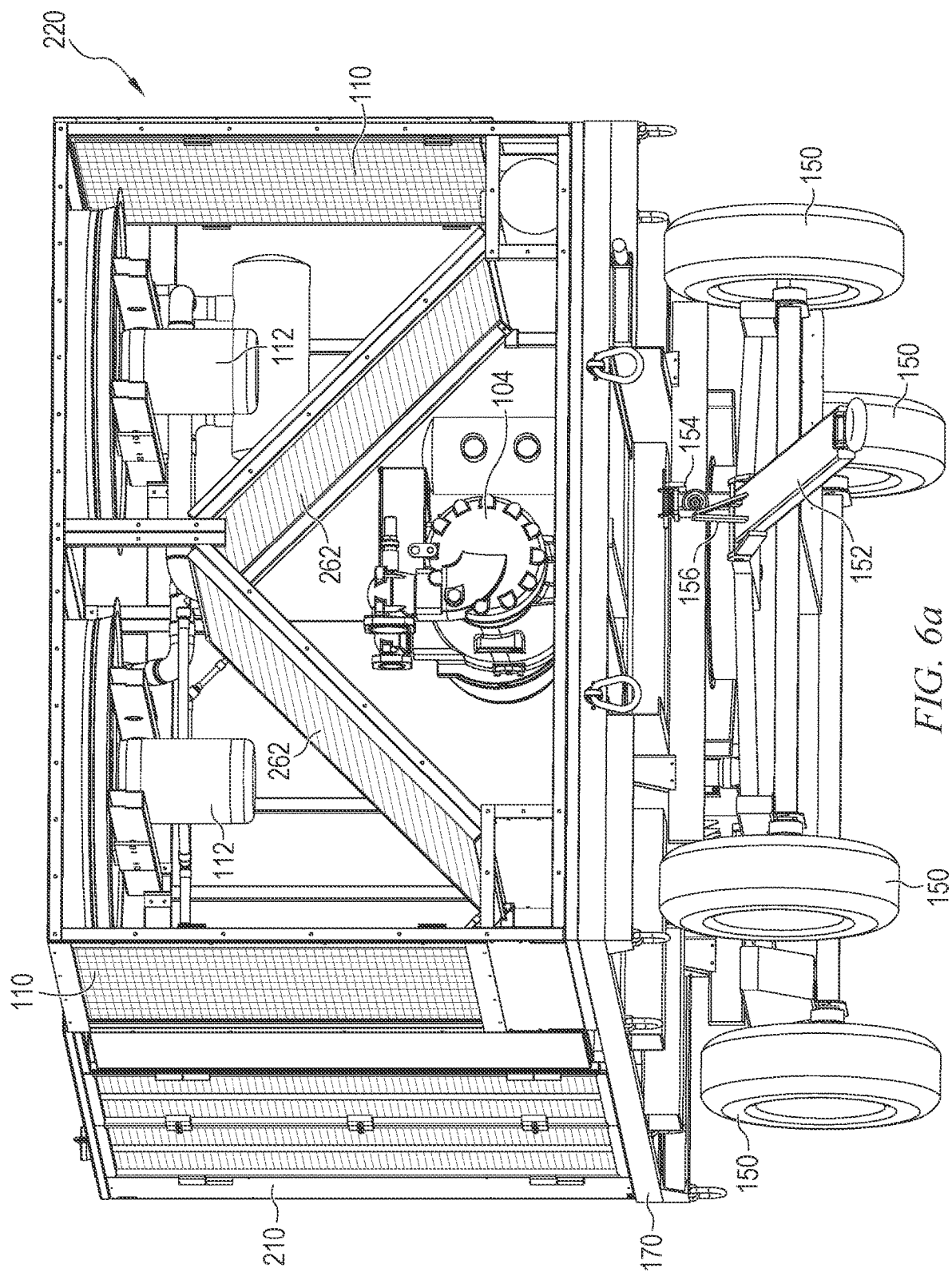
FIGS. 6a and 6b illustrate a condenser module.
Figure 6B:
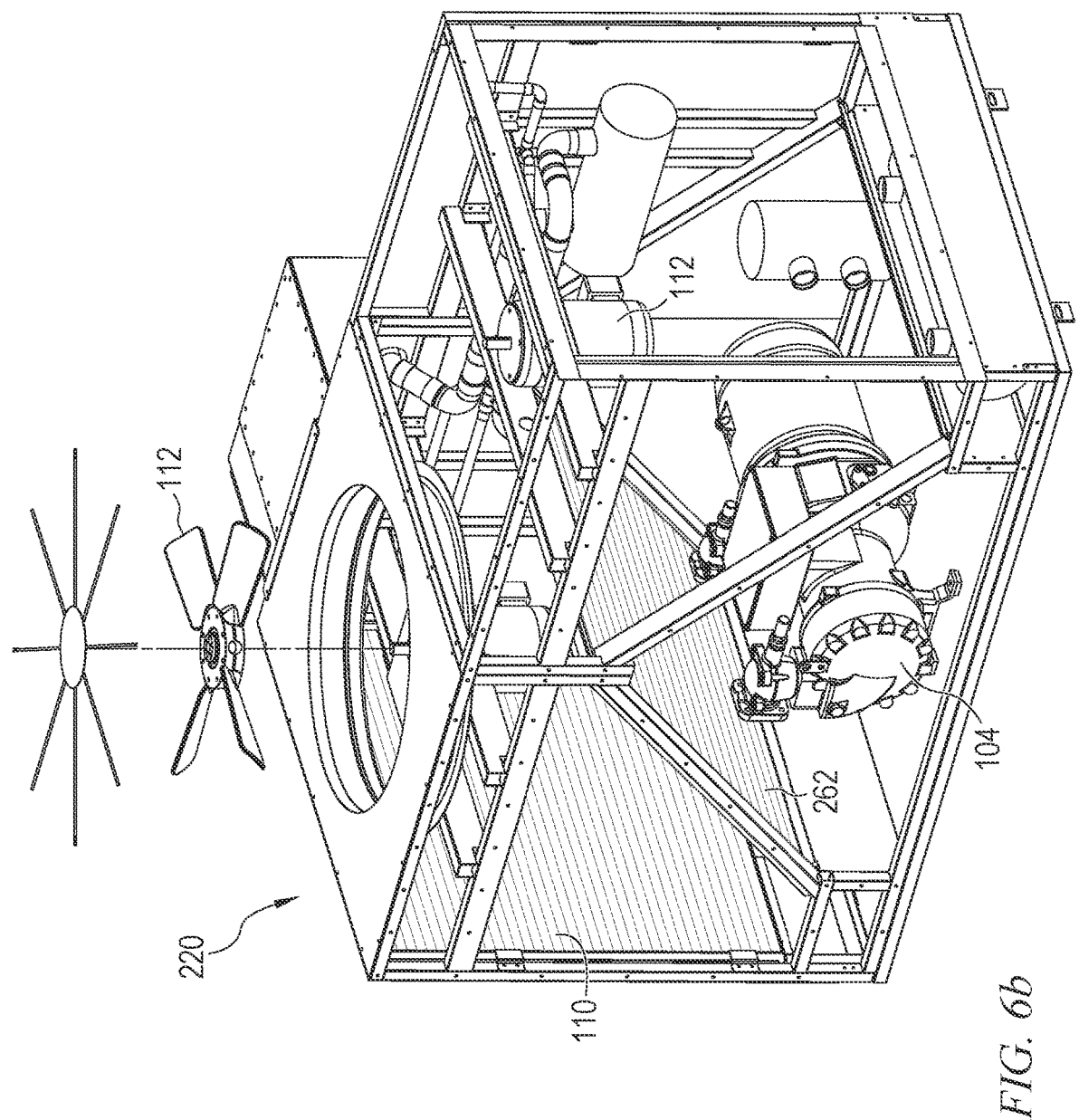

FIGS. 6a and 6b show internal details of condenser module 220. Two condenser coils 110 are coupled so that refrigerant flows through them in series or parallel. Two fans 112 are provided, one for each condenser coil. Metal sheets 262 keep the air flow contained within the air chambers between fans 112 and respective condenser coils 110. Condenser 104 is centrally located under and between the two metal sheets 262. The components of condenser module 220 are coupled as shown in FIG. 1, although not all conduits are illustrated.

While one or more embodiments of the present invention have been illustrated in detail, the skilled artisan will appreciate that modifications and adaptations to those embodiments may be made without departing from the scope of the present invention as set forth in the following claims.

What is claimed:
1. An HVAC system, comprising:
a duct including an inlet and an outlet;
a first supercharger disposed in the duct;
a second supercharger disposed in the duct in parallel with the first supercharger;
a gearbox comprising a first output shaft coupled to the first supercharger and a second output shaft of the gearbox coupled to the second supercharger;

a first evaporation coil disposed in the duct between the first supercharger and inlet;
a second evaporation coil disposed in the duct between the first supercharger and outlet; and
a heater disposed in the duct between the first supercharger and outlet.

2. The HVAC system of claim 1, further including a third supercharger disposed in the duct in parallel with the first supercharger and second supercharger.

3. The HVAC system of claim 2, wherein an input shaft of the third supercharger is coupled to the input shaft of the second supercharger.

4. The HVAC system of claim 1, further including a compressor coupled to the first evaporation coil and the second evaporation coil.

5. The HVAC system of claim 1, further including a trailer frame, wherein the duct is disposed on a trailer frame.

6. The HVAC system of claim 5, further including a genset disposed on the trailer frame.

7. The HVAC system of claim 1, further including a backflow duct comprising an input of the backflow duct coupled to the duct between the first supercharger and the inlet and an output of the backflow duct coupled to the duct between the first supercharger and the outlet.

8. The HVAC system of claim 7, further including a pressure control valve disposed in the backflow duct.

9. The HVAC system of claim 1, further including a power inverter configured to provide electrical power to off-board devices or components.

10. The HVAC system of claim 1, further including an electric motor comprising a power takeoff, wherein an input of the gearbox is coupled to the power takeoff.

11. The HVAC system of claim 1, further including a condenser coil coupled to the first evaporation coil and second evaporation coil.

12. The HVAC system of claim 11, further including:
a trough disposed under the first evaporation coil;
a pump coupled to the trough; and
a nozzle coupled to the pump, wherein the nozzle is oriented to spray the condenser coil.

13. An HVAC system, comprising:
a duct including an inlet and an outlet;
a first supercharger disposed in the duct;
a second supercharger disposed in the duct in parallel with the first supercharger;
a first evaporation coil disposed in the duct between the first supercharger and inlet;
a second evaporation coil disposed in the duct between the first supercharger and outlet; and
a heater disposed in the duct between the first supercharger and outlet.

14. The HVAC system of claim 13, further including a backflow duct comprising an input of the backflow duct coupled to the duct between the first supercharger and the inlet and an output of the backflow duct coupled to the duct between the first supercharger and the outlet.

15. The HVAC system of claim 14, further including a pressure control valve disposed in the backflow duct.

16. The HVAC system of claim 13, further including a power inverter configured to provide electrical power to off-board devices or components.

17. The HVAC system of claim 13, further including:
an electric motor comprising a power takeoff; and
a gearbox comprising an input coupled to the power takeoff and an output of the gearbox coupled to the first supercharger and second supercharger.

18. The HVAC system of claim 13, further including a condenser coil coupled to the first evaporation coil and second evaporation coil.

19. The HVAC system of claim 18, further including:
a trough disposed under the first evaporation coil;
a pump coupled to the trough; and
a nozzle coupled to the pump, wherein the nozzle is oriented to spray the condenser coil.

* * * * *